United States Patent Office 3,219,911
Patented Nov. 23, 1965

3,219,911
OVERLOAD PROTECTION CIRCUIT
Karl L. Burfeindt, Thornwood, N.Y., assignor to United Aircraft Corporation, East Hartford, Conn., a corporation of Delaware
Filed Aug. 26, 1960, Ser. No. 52,094
3 Claims. (Cl. 323—22)

My invention relates to an overload protection circuit for power supplies and more particularly to an overload protection circuit for transistorized power supplies.

The more efficient power supplies employ a series voltage regulating element. An error sensor detects variations in output voltage from the desired value and controls the impedance of the series regulating element. If the power supply were overloaded, as by a short-circuit, the impedance of the series regulating element would be reduced. The series regulating element would sustain a voltage many times normal value and would be forced to pass currents greatly exceeding rated value. The high voltage drop in conjunction with the large currents produce power dissipations which lead in a short time to destruction of the series regulating element. For vacuum tube power supplies the time delay occasioned by thermal lag of simple fuses and the mechanical lag in circuit breakers is not so critical that a vacuum tube series regulating element would be destroyed. However, for a transistor series regulating element, simple thermal fuses and electromechanical circuit breakers have insufficient speed of response to prevent destruction of the series transistor because of excessive power dissipation.

In the prior art the necessity of limiting overload currents and particularly short circuit currents has been appreciated. In some protection circuits of the prior art the power supply acts as a constant voltage source for loads up to rated value and then acts as a constant current source for loads exceeding rated value. In such power supply protection circuits of the prior art, the current through the series regulating element is maintained at rated value while the output voltage drops from its regulated value to zero for a short circuit. However, the series regulating element sustains the entire input voltage while passing rated current. Thus, the power dissipation may be from five to ten times that at maximum load with normal output voltage. For such constant current power supplies of the prior art, it is necessary to employ a transistor capable of dissipating five to ten times normal full-load dissipation to obviate destruction by overheating. Such "brute-force" method is inefficient and undesirable.

Further in the prior art have been employed cyclic on-off protection circuits which override the voltage error sensor periodically to reduce the current through the series regulating element upon an overload. Such overriding circuits periodically enable the voltage error sensor; and if the current drain exceeds rated value, then again disable or override the voltage error sensor. It is usual in power supplies to employ an electrolytic capacitor of high capacitance value to reduce the alternating current output impedance to small values at the higher freqencies where the gain of the voltage error sensor decreases. These high capacity electrolytic capacitors are capable of absorbing large currents with small rates of change of voltage. The large charging currents absorbed by the output electrolytic storage capacitor will cause the voltage error sensor to be disabled. If the repetitive on-off cycle has a relatively short enabling or on period and a relatively long disabling or off period, as would be required to protect the series regulating transistor, then if maximum load is imposed upon removal of a short circuit, the output voltage may never return to rated value.

I have invented a protection circuit for power supplies in which the maximum power dissipated by the series regulating element during overload conditions is reduced to reasonable values not appreciably greater than the power dissipation at rated load. My power supply protection circuit is continuous in operation with no on-off cycle so that if maximum load is imposed upon removal of a short circuit, a large electrolytic output capacitor is rapidly recharged to rated output voltage. My power supply protection circuit is adapted to decrease both the load current and the output voltage upon overload. As the extent of short-circuiting is reduced and as the load is reduced to rated value, the output voltage and output current will both increase to rated values. My power supply overload protection circuit is rapid and positive and continuous in operation.

One object of my invention is to supply a protection circuit for power supplies in which the power dissipation of the series regulating element for overloads is not appreciably greater than that for maximum load.

Another object of my invention is to provide a protection circuit for power supplies which is continuous in operation and exhibits no periodic on-off cycle of operation, and which is adapted to recharge a large electrolytic filtering capacitor upon removal of a short circuit without the necessity of reducing the load below rated value.

A further object of my invention is to provide a protection circuit for power supplies which reduces both output current and voltage upon an overload.

Other and further objects of my invention will appear from the following description:

In general my invention contemplates the provision of a power supply employing a series regulating element, such as a silicon junction transistor connected as an emitter follower. Because of the high incremental collector resistance of a junction transistor, the collector current is substantially independent of collector voltage and determined mainly by the base current and hence by the voltage between base and emitter. I compare the output voltage of the power supply with a reference voltage, amplify the difference therebetween, and apply the amplified difference signal to the base of the series regulating transistor. At rated output current there will exist a certain voltage difference between the base and the emitter of the series regulating transistor. If I merely prevented the base-to-emitter voltage of the series transistor from exceeding this fixed value, then the power supply would act as a constant current source for overloads with resultant destruction of the series transistor from excessive power dissipation. However, I prevent the base-to-emitter voltage of the series transistor from exceeding a variable level which is proportional to output voltage. Thus the permissible output current is roughly proportional to output voltage. At rated output voltage, rated output current is permitted to flow as the load is increased to rated value. If the load is further increased, the current is prevented from increasing. Accordingly, the output voltage of the power supply will decrease. This decrease in output voltage causes a reduction in the maximum permissible current. The operation is smooth and continuous, and results in low output current for the ultimate short circuit condition where the output voltage is zero.

In the accompanying drawings which form part of the instant specification and which are to be read in conjunction therewith and in which like reference numerals are used to indicate like parts in the various views.

Figure 1:
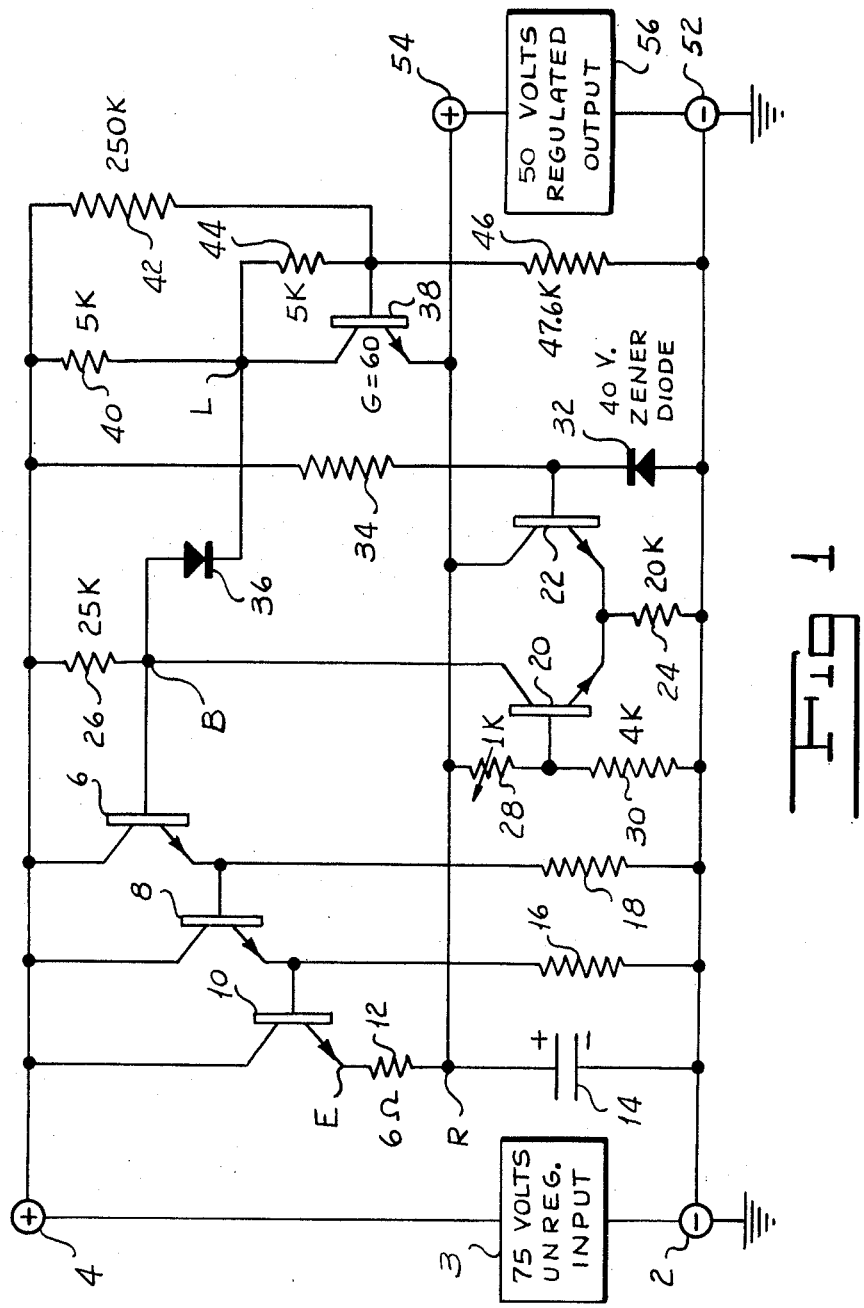
FIGURE 1 is a schematic view of a first form of my power supply protection circuit in which a negative feedback inverting amplifier responsive to power supply output voltage provides the variable voltage level which determines the maximum permissible output current.

Referring more particularly now to FIGURE 1, a source of 75 volts unregulated input 3 is connected between a negative input terminal 2 and a positive input terminal 4. The negative terminal 2 is grounded. The positive input terminal 4 is connected to the collector of the series regulating transistor 10. The emitter of transistor 10 is connected through a 6 ohm resistor 12 to the positive output terminal 54. Output terminal 54 is connected to ground through an electrolytic filtering capacitor 14 which is appropriately polarized. An output load 56 is connected between the positive terminal 54 and a negative terminal 52 which is grounded. The output between the terminals 54 and 52 is to be regulated at 50 volts. Output terminal 54 is connected to ground through a voltage divider comprising a variable resistor 28 having a nominal value of 1 kilohm and a fixed resistor 30 having a value of 4 kilohms. The junction of resistors 28 and 30 is connected to the base of a transistor 20. The positive input terminal 4 is connected through a current limiting resistor 34 to the cathode of a diode 32, the anode of which is grounded. Diode 32 is a backwardly biased silicon diode operating in the Zener breakdown region as a constant voltage device which sustains a nominal drop of 40 volts. The cathode of voltage regulating diode 32 is connected to the base of a transistor 22. The emitters of transistors 20 and 22 are each connected through a common 20 kilohm resistor 24 to ground. The collector of transistor 22 is connected to the positive output terminal 54; and the collector of transistor 20 is connected through a 25 kilohm resistor 26 to the positive input terminal 4. The collector of transistor 20 is connected to the base of a transistor 6. The emitter of transistor 6 is connected through a resistor 18 to ground and to the base of a transistor 8. The emitter of transistor 8 is connected through a resistor 16 to ground and to the base of the series regulating transistor 10. The collectors of transistors 6 and 8 are connected to the positive input terminal 4. I provide a transistor 38 having a grounded-emitter base-to-collector current gain G of 60, for example. The emitter of transistor 38 is connected to the positive output terminal 54. The collector of transistor 38 is connected through a 5 kilohm resistor 40 to the positive input terminal 4. A 5 kilohm feed-back resistor 44 is connected between the collector and the base of transistor 38. A primary input resistor 46 having a value of 47.6 kilohms is connected between the base of transistor 38 and ground. An auxiliary input resistor 42 having a value of 250 kilohms is connected between the base of transistor 38 and the positive input terminal 4. The collector of transistor 20 is connected forwardly through a diode 36 to the collector of transistor 38. The reference letter B designates the junction of the collector of transistor 20 and the base of transistor 6 and the anode of crystal 36. The reference letter E designates the emitter of series regulating transistor 10. The reference letter R designates output terminal 54. And the reference letter L designates the junction of the cathode of crystal 36 and the collector of transistor 38.

Figure 3:
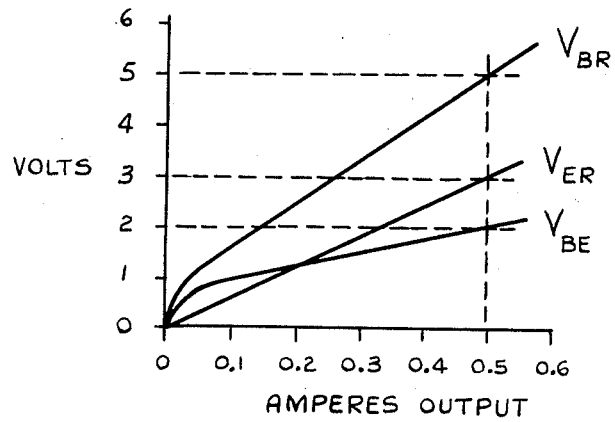
FIGURE 3 is a graph of control voltage against output amperes for the series regulating transistor.

Referring now to FIGURE 3, it is seen that $V_{ER}$ which represents the voltage drop across the 6 ohm resistor 12 increases linearly with output current to a value of 3 volts at 0.5 ampere output current. FIGURE 3 also shows that $V_{BE}$ which represents essentially the base-to-emitter voltage of transistor 10, since the voltage losses in transistors 6 and 8 are negligible, increases non-linearly with output current to a value of 2 volts at 0.5 ampere output current. The total voltage drop $V_{BR}$ which is the sum of $V_{BE}$ and $V_{ER}$ increases somewhat non-linearly with output current to a value of 5 volts at 0.5 ampere output current. Thus $V_{BR}$ affords a measure of output current.

Emitter-coupled transistors 20 and 22 form a balanced voltage amplifier, the output of which is impressed upon a first emitter follower comprising transistor 6. The output of the first emitter follower 6 is impressed upon a driver emitter follower comprising transistor 8, the output of which supplies the base current for the series regulating emitter follower transistor 10. Emitter followers 6 and 8 have a total gain of substantially unity and hence introduce negligible voltage loss. The voltage divider comprising resistors 28 and 30 causes the base potential of transistor 20 to be 40 volts when the output at terminal 54 is the desired 50 volts. When the load current is small, the potential of point B will differ only slightly from 50 volts; and each of transistors 20 and 22 will have 10 volts collector voltage and 1 milliampere collector current, with 2 milliamperes flowing through the common emitter resistor 24. If the load resistance is reduced so that increased output current is drawn, then, because of the increased voltage drop $V_{BR}$, the potential at output terminal 54 will tend to decrease below 50 volts. However, the potential of the base of transistor 20 will then become more negative reducing the flow of collector current in transistor 20 and causing the potential of point B to increase which tends to raise the output voltage at terminal 54. The high voltage gain of the balanced amplifier comprising transistors 20 and 22 and the high current gains of emitter followers 6 and 8 produce a large open-loop gain, so that the output voltage at terminal 54 remains substantially constant at 50 volts for all output currents up to 0.5 ampere. The region of regulation is shown by the horizontal line in FIGURE 4.

The reference letter L designates the collector of the inverting amplifier transistor 38. Since the maximum output current is to be 0.5 ampere, the voltage at point L should be 5 volts more positive than the potential at output terminal 54 when such potential is 50 volts. Thus the potential at point L in the region of regulation should be 55 volts. The nominal current through collector resistor 40 in the regulation region will be 4 milliamperes. One milliampere will flow through the feed-back resistor 44. Thus the nominal collector current of transistor 38 will be 3 milliamperes. The nominal current through the auxiliary input resistor 42 will be 0.1 milliampere. Since the grounded emitter base-to-collector current gain G of transistor 37 is 60, a base current of 0.5 milliampere will be required to produce a collector current of 3 milliamperes, neglecting the flow of any small base cut-off collector current. The total current flowing towards the base of transistor 38 is thus 1.1 milliampere. In order that the net base current be .05 milliampere, the current flowing away from the base of transistor 38 through the primary input resistor 46 should be 1.05 milliampere. Since the voltage across resistor 46 is substantially 50 volts, resistor 46 will have a value slightly less than 50 kilohms or more precisely a value of 47.6 kilohms.

When the output current reaches 0.5 ampere the potential at point B will be 55 volts which is the same potential existing at point L. If the load is further reduced, the potential at point B will tend to rise in order to maintain the output voltage at terminal 54 constant at 50 volts. However, crystal 36 now becomes forwardly biased preventing $V_{BR}$ from appreciably exceeding 5 volts. The potential at terminal 54 will begin to decrease, since clamping diode 36 overrides and disables the signal from transistor 20. The decreased output voltage at terminal 54 results in a reduced current flow through primary input resistor 46 and in an increased flow through auxiliary input resistor 42. This results in an increased base current in transistor 38, increasing its collector current, and causing the potential at point L relative to the potential at point R to decrease to a value of less than 5 volts.

Figure 4:
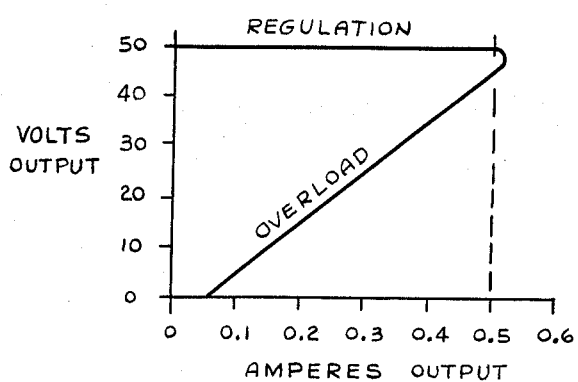
FIGURE 4 is a graph of output voltage against output amperes for my power supply protection circuit.

Clamping diode 36, thus, further reduces $V_{BR}$ which in turn further reduces the flow of output current. As may be seen by reference to FIGURE 4, in the overload region the output current decreases with output voltage, because of the action of the inverting amplifier transistor 38 which causes the potential at point L relative to point R to be decreased in accordance with a decrease in output voltage. It is desired that for a short circuit condition, when the output voltage is zero, that potential of point L be also substantially zero. For such short circuit condition, transistor 20 will be cut off. In order that point L be at zero volts, the collector current of transistor 38 will be 18 milliamperes comprising 15 milliamperes through resistor 40 and 3 milliamperes through resistor 26 which pass through diode 36. Since the current gain of transistor 38 is 60, the base current must be 0.3 milliampere. The currents through resistors 44 and 46 will be zero; hence the auxiliary input resistor 42 must supply the required 0.3 milliampere base current. Under a short circuit condition the voltage drop across resistor 42 will be normally 75 volts which will accordingly cause the desired base current flow of 0.3 milliampere through resistor 42 if its value is 250 kilohms. It is seen in FIGURE 4 that in the overload region for a short circuit the output current is not reduced completely to zero because of the unavoidable flow of cut-off collector current in the series regulating transistor 10.

Inverting amplifier transistor 38 has a very low output impedance because of the large amount of negative feedback through resistor 44. Transistor 38 thus provides a collector output voltage substantially independent of variations in the nominal 75 volt input at terminal 4. Assume that the voltage at terminal 4 were reduced by 10 volts to a value of 65 volts. If the potential of point L remains substantially 55 volts, then the current through resistor 40 would be reduced to 2 milliamperes; and the collector current of transistor 38 would be reduced to 1 milliampere. The current through the auxiliary input resistor 42 would be reduced by .04 milliampere from 0.1 milliampere to .06 milliampere. The net base current of transistor 38 would thus be reduced by .04 milliampere from .05 milliampere to .01 milliampere, a value sufficient to produce only 0.6 milliampere collector current. Accordingly the collector voltage of transistor 38 will rise by 33 millivolts to 5.033 volts, increasing the current through feed-back resistor 44 by .0067 milliampere to a value of 1.0067 milliamperes. The net base current is now .0167 milliampere, a value which will produce the required 1 milliampere collector current. Hence a change of 10 volts in the potential of terminal 4 will produce only a 33 millivolt change in the potential at point L. This represents the negligible change in collector voltage of .033 part out of 5 or 0.67%. Accordingly there is negligible change in the maximum output current at which overload action is initiated.

It is essential that transistor 20 be cut off for all output voltages less than the desired regulated value. For all overload conditions the potential at point B would increase but for the clamping action of diode 36 to the low impedance output at point L of the inverting transistor 38. The potential of the common emitters of transistors 20 and 22 will remain at 40 volts until the potential at terminal 54 decreases to 40 volts. As the potential at output terminal 54 further decreases to values less than 40 volts, the potential of the common emitters of balanced transistors 20 and 22 will follow the potential at output terminal 54; and Zener diode 32 will be cut off. However, the voltage divider comprising resistor 28 and 30 insures that the potential of the base of transistor 20 is always less than that of output terminal 54. Accordingly transistor 20 remains cut off for all output voltages less than 50 volts.

Figure 5:
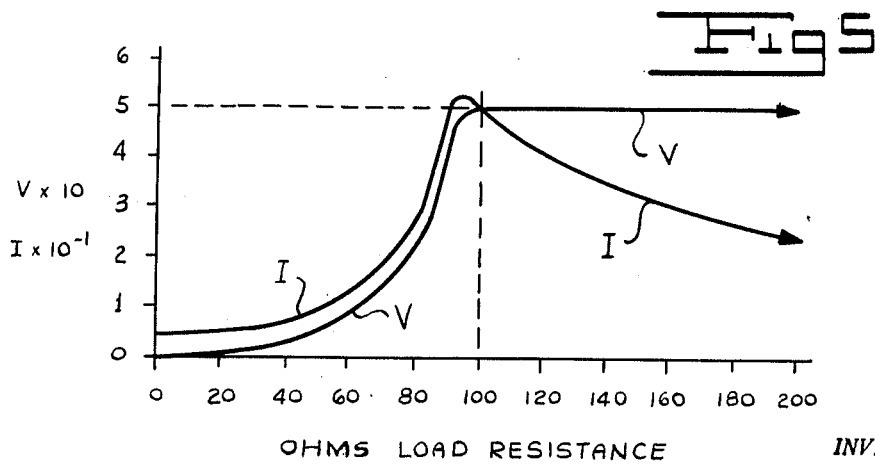
FIGURE 5 is a graph of output voltage and output current against load resistance in ohms.

Referring to FIGURE 5, it is seen that output voltage remains constant at 50 volts as the load resistance is reduced to a value of 100 ohms where the output current is 0.5 ampere. As the load resistance is further reduced, the output voltage decreases and is accompanied by a decrease in output current. The decrease in output current reduces the power dissipation of the series regulator transistor 10, preventing its destruction from overheating. The curves of FIGURES 4 and 5 are reversible as the extent of overload is increased or reduced. It may be noted that it is desirable for some output current to flow under short circuit conditions so that the initial rate of charge of electrolytic capacitor 14 upon removal of a short circuit is moderately large. It will be appreciated that, if the output current under short circuit conditions were reduced substantially to zero, then upon removal of the short circuit, the initial rate of charge of the electrolytic capacitor 14 would be so low that normal output voltage would not be regained for an excessively long time interval. It will be seen from FIGURE 4, that even if maximum load of 100 ohms is imposed upon removal of a short circuit; yet the circuit will still recover, since there is a substantially constant increment of 50 excess milliamperes at all output voltages available for recharging the filter capacitor 14. Hence even for maximum load, the output voltage will rise rapidly and almost linearly to rated value.

Figure 2:
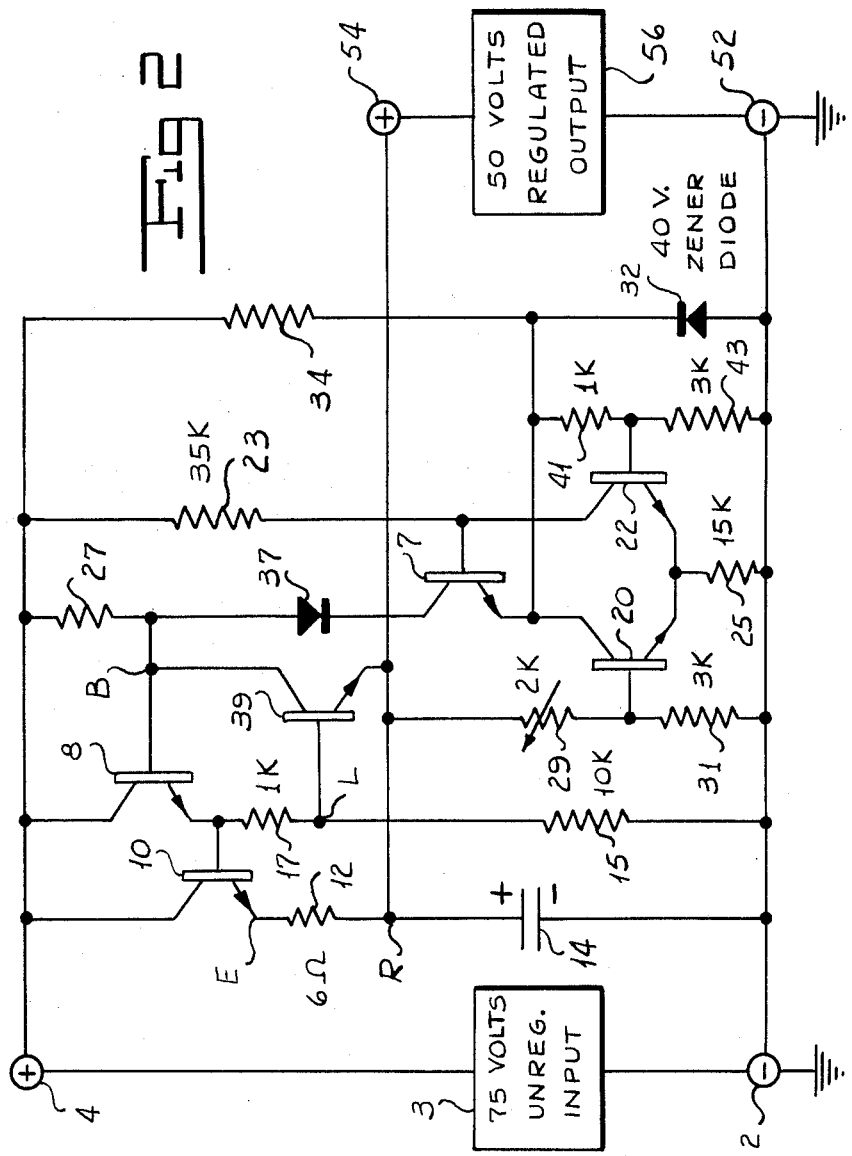
FIGURE 2 is a schematic view of a second form of my power supply protection circuit in which a voltage-divider provides the variable voltage level determining the maximum output current.

Referring more particularly now to FIGURE 2 which embodies a second form of my invention, a source of 75 volts unregulated input voltage 3 is connected between the grounded negative terminal 2 and the positive input terminal 4. Terminal 4 is connected to the collector of the series regulating transistor 10. The emitter of transistor 10 is connected through a 6 ohm resister 12 to the positive output terminal 54. Output terminal 4 is connected to ground through an electrolytic filter capacitor 14 which is appropriately polarized. An output load 56 is connected between terminal 54 and the negative terminal 52 which is grounded. Again the output between terminals 52 and 54 is to be regulated at 50 volts. Output terminal 54 is connected to ground through a voltage divider comprising a variable resistor 29 having a nominal value of 2 kilohms and a fixed resistor 31 having a value of 3 kilohms. The junction of resistors 29 and 31 is connected to the base of transistor 20. The positive input terminal 4 is connected through a current limiting resistor 34 to the cathode of diode 32, the anode of which is at ground. Again diode 32 is a silicon diode having an inverse Zener break-down voltage of nominally 40 volts. The cathode of crystal 32 is connected to the collector of transistor 20 and to the emitter of a transistor 7. The cathode of crystal 32 is also connected to ground through a voltage divider comprising a resistor 41 having a value of 1 kilohm and a resistor 43 having a value of 3 kilohms. The junction of resistors 41 and 43 is connected to the base of transistor 22. The emitters of transistors 20 and 22 are each connected through a common 15 kilohm resistor 25 to ground. The collector of transistor 22 is connected through a 35 kilohm resistor 23 to input terminal 4 and to the base of transistor 7. Input terminal 4 is connected to the collector of transistor 8; and the emitter of transistor 8 is connected to the base of series regulating transistor 10. Input terminal 4 is connected through a resistor 27 to the base of transistor 8. The base of transistor 8 is connected forwardly through a crystal 37 to the collector of transistor 7. The emitter of transistor 8 is connected to ground through a voltage divider comprising a 1 kilohm resistor 17 and a 10 kilohm resistor 15. The junction of resistors 15 and 17 is connected to the base of an overload transistor 39. The emitter of transistor 39 is connected to output terminal 54; and the collector of transistor 39 is connected to the base of transistor 8. The reference letter E again designates the emitter of series regulating transistor 10. The reference letter R designates output terminal 54, which is connected to the emitter of transistor 39. The reference letter B designates the junction of the base of transistor 8 and the collector of transistor 39. The reference letter L designates the base of transistor 39.

FIGURE 3 is also applicable to the second form of my invention shown in FIGURE 2. Again the voltage $V_{BE}$ is essentially the base-to-emitter voltage of transistor 10, since the voltage loss in emitter follower 8, having a gain of substantially unity, is negligible. Accordingly, the total voltage drop $V_{BR}$ is substantially equal to the sum of the voltages $V_{BE}$ and $V_{ER}$; and again $V_{BR}$ affords a measure of output current.

Emitter-coupled transistors 20 and 22 form a balanced current amplifier, the output of which is impressed upon voltage amplifier transistor 7. Crystal 37 is polarized to permit the flow of collector current for normal transistor action in transistor 7. The output of the voltage amplifier transistor 7 is impressed upon a driver emitter follower comprising transistor 8, the output of which supplies the base current for the series regulating emitter follower transistor 10. The voltage divider comprising resistors 29 and 31 causes the base potential of transistor 20 to be 30 volts when the output at terminal 54 is the desired value of 50 volts. The voltage divider comprising resistors 41 and 43 causes the base potential of transistor 22 to be 30 volts if Zener diode 32 sustains precisely an inverse breakdown voltage of 40 volts. The base of voltage amplifier transistor 7 is substantially at the same potential as the emitter of transistor 7. Hence, the collector of transistor 22 is at a potential of substantially 40 volts. Each of transistors 20 and 22 will have 10 volts collector voltage and 1 milliampere collector current, with 2 milliamperes flowing through the common emitter resistor 25. When the load current is small, transistor 7 conducts sufficient current so that the potential at point B differs only slightly from 50 volts. If the load resistance is reduced so that increased output current is drawn, then, because of the increased voltage drop $V_{BR}$, the potential at output terminal 54 will decrease below 50 volts. However, the potential at the base of transistor 20 will then become more negative, reducing the voltage existing at the common emitters of transistors 20 and 22. Since the base of voltage of transistor 22 remains substantially constant, the reduction in common emitter voltage results in increased base current and hence in increased collector current in transistor 22. This reduces the base current and hence the collector current in transistor 7. The potential at point B increases which raises the output voltage at terminal 54. The high current gain of the balanced amplifier comprising transistors 20 and 22 and high voltage gain of "grounded" emitter transistor 7 and the high current gain of emitter follower 8 produce a large open-loop gain, so that the output voltage at terminal 54 remains substantially constant at 50 volts for all output currents up to 0.5 ampere. Again the region of regulation is shown by the horizontal line in FIGURE 4. The reference letter L designates the junction of resistors 15 and 17. Since the maximum output current is to be 0.5 ampere, the voltage at point L should be 50 volts when the potential at point B (which is substantially equal to the potential of the emitter of transistor 8) is 55 volts. For this condition the voltage across resistor 15 will be 50 volts and the voltage across resistor 17 will be 5 volts. Since the voltage drops are in the ratio of 10 to 1 the resistance values of resistors 15 and 17 must likewise be in the ratio of 10 to 1, as for example, a value of 10 kilohms for resistor 15 and a value of 1 kilohm for resistor 17.

When the output current reaches 0.5 ampere, the potential at point B will be 55 volts and the potential at point L will be 50 volts. If the load is further reduced, the potential at point B will tend to rise in order to maintain the output voltage at terminal 54 constant at 50 volts. However, the potential at point L will now tend to rise above 50 volts. Base current will now flow in overload transistor 39, causing an amplified collector current which reduces the potential at point B, preventing $V_{BR}$ from appreciably exceeding 5 volts. The potential at terminal 54 will begin to decrease, since overload transistor 39 disables the signal from transistor 7. During overload operation the potential at point L is substantially equal to the potential at point R. Hence for overload operation the voltage across resistor 15 is substantially the same as the output voltage at terminal 54. But the voltage across resistor 17 is proportional to that across resistor 15, being in the ratio of 1 to 10. The voltage across resistor 17 for overload operation is thus substantially equal to $V_{BR}$. As the output voltage at terminal 54 decreases, the voltage drop across resistor 15 decreases; and the voltage drop across resistor 17 likewise decreases. The reduced voltage across resistor 17 represents a lesser value of $V_{BR}$ which in turn signifies a decreased value of output current. Again, as may be seen by reference to FIGURE 4, in the overload region the output current decreases with output voltage because of the action of voltage dividing resistors 15 and 17 in conjunction with overload transistor 39 which reduces the potential $V_{RB}$ in accordance with a decrease in output voltage. Again in FIGURE 5 it is seen that for a short circuit the output current is not reduced completely to zero because of the flow of cut-off collector current in transistor 10.

It is essential that for all output voltages less than the desired 50 volt value transistor 7 be cut off. Accordingly, I have shown the junction of the collector of transistor 20 and the emitter of transistor 7 to be supplied with constant voltage from Zener diode 32 rather than from the variable voltage which may exist at terminal 54 under overload conditions. For all overload conditions transistor 20 will be cut off, turning transistor 22 on, thus, cutting off transistor 7. The potential at the collector of transistor 22 and the base of transistor 7 will be substantially 30 volts, since transistor 22 is turned on. I have provided crystal 37 so that transistor 7 will not adversely affect the overload operation of transistor 39 when the potential at point B becomes less than 30 volts. Assume for the moment that crystal 37 were omitted and that the collector of transistor 7 were directly connected to point B and that the potential at point B is slightly greater than 40 volts. The potential at the emitter of transistor 7 is 40 volts and the potential of the base of transistor 7 is substantially 30 volts; hence, transistor 7 is cut off. If the potential of point B drops to less than 40 volts, the voltage between collector and base of transistor 7 will be of a polarity opposite to that for normal operation. Since the base voltage is less than that of either the collector or the emiter, transistor 7 will still be cut off. If the potential of point B now drops to less than 30 volts, the collector of transistor 7 would become more negative than its base. It will be seen then that the potentials applied to transistor 7 are such as to produce inverted transistor action with the emitter now operating as a collector and the collector operating as an emitter. The inverted transistor action of transistor 7 produces an emitter follower circuit with the collector now serving as a low-output impedance emitter, which would tend to prevent the potential at point B from dropping below 30 volts, the base potential, even though overload transistor 39 may conduct appreciable collector current. Crystal 37 blocks a flow of inverted transistor current from transistor 7 which would tend to prevent the potential at point B from dropping below 30 volts. Crystal 37 thus prevents inverted transistor action in transistor 7, permitting overload transistor 37 to control the potential of point B at values less than 30 volts.

The curve of FIGURE 5 also applies to the circuit of FIGURE 2. A constant 50 volts output is maintained for load resistance up to 100 ohms. Again the curves of FIGURES 4 and 5 are reversible in the overload region for the form of my invention shown in FIGURE 2 Again in FIGURE 2, the circuit will recover full output voltage even if full load is imposed upon the removal of a short-circuit, since the output current for each output voltage is approximately 50 milliamperes more than would be required by the load, thus providing an excess current available for recharging filter capacitor 14.

It will be seen that I have accomplished the objects of my invention. My protection circuit reduces both the output voltage and the output current upon an overload, reducing the power dissipation in the series regulating element to values not appreciably greater than that for maximum load, obviating destruction from overheating. My protection circuit is continuous in operation and reversibly varies output voltage and current as the extent of overload is varied. My protection circuit, for all output voltages less than regulated value, supplies appreciable excess current over that required by maximum rated load, permitting rapid recharging of an output filter capacitor and rapid recovery of full output voltage, even though maximum load be imposed upon removal of a short circuit.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A power supply overload protection circuit including in combination a voltage source having a pair of terminals, a variable impedance element having a first terminal and a control terminal and a common reference terminal, means connecting one terminal of the source to the first terminal of the element, a direct-current amplifier having an input terminal and a reference terminal and providing an output, means connecting the common reference terminal of the element to the reference terminal of the amplifier, means responsive to the voltage at the reference terminal of the amplifier for coupling a control voltage to the control terminal of the element, means coupling the output of the amplifier to the control voltage means, means including a first resistor for coupling the output of the amplifier to the input terminal of the amplifier, and a second resistor connecting the other terminal of the source to the input terminal of the amplifier.

2. A power supply overload protection circuit including in combination a voltage source having a pair of terminals, a variable impedance element having a first terminal and a control terminal and a common reference terminal, means connecting one terminal of the source to the first terminal of the element, means providing a control voltage, means coupling the control voltage to the control terminal of the element, a direct-current amplifier providing an output and having an input terminal and a reference terminal, means connecting the common reference terminal of the element to the reference terminal of the amplifier, a unilateral impedance coupling the output of the amplifier to the control voltage means, a feedback resistor coupling the output of the amplifier to the input terminal of the amplifier, and an input resistor connecting the other terminal of the source to the input terminal of the amplifier.

3. A power supply overload protection circuit including in combination a voltage source having a pair of terminals, a variable impedance element having a first terminal and a control terminal and a common reference terminal, means connecting one terminal of the source to the first terminal of the element, means providing a control voltage, means coupling the control voltage to the control terminal of the element, direct-current amplifying means providing an output and having an input terminal and a reference terminal, the amplifying means having a unilateral input characteristic, means connecting the common reference terminal of the element to the reference terminal of the amplifying means, means coupling the output of the amplifying means to the control voltage means, means responsive to the control voltage means and including a first resistor for coupling a signal to the input terminal of the amplifying means, and a second resistor connecting the other terminal of the source to the input terminal of the amplifying means.

References Cited by the Examiner

UNITED STATES PATENTS

| | | | |
|---|---|---|---|
| 2,888,633 | 5/1959 | Carter | 323—22 |
| 2,904,742 | 9/1959 | Chase | 323—22 |
| 2,912,635 | 11/1959 | Moore | 323—22 |
| 2,915,693 | 12/1959 | Harrison | 323—22 |
| 2,967,251 | 1/1961 | Dodge | 323—22 |
| 2,974,270 | 3/1961 | Christiansen | 323—22 |
| 2,976,475 | 3/1961 | Dodge | 323—22 |
| 3,072,842 | 1/1963 | Vaughn | 323—22 |
| 3,078,410 | 2/1963 | Thomas | 323—22 |
| 3,105,188 | 9/1963 | Harrison | 323—22 |
| 3,131,344 | 4/1964 | Rosenfeld | 323—9 |

LLOYD McCOLLUM, *Primary Examiner.*

MILTON O. HIRSHFIELD, *Examiner.*